United States Patent
Sawai

(10) Patent No.: US 8,864,315 B2
(45) Date of Patent: Oct. 21, 2014

(54) IMAGE PROJECTION APPARATUS

(75) Inventor: Yasumasa Sawai, Yamatotakada (JP)

(73) Assignee: Konica Minolta Opto, Inc., Tokyo (JP)

( * ) Notice: Subject to any disclaimer, the term of this patent is extended or adjusted under 35 U.S.C. 154(b) by 514 days.

(21) Appl. No.: 13/362,960

(22) Filed: Jan. 31, 2012

(65) Prior Publication Data

US 2012/0194787 A1 Aug. 2, 2012

(30) Foreign Application Priority Data

Jan. 31, 2011 (JP) ................................. 2011-017533

(51) Int. Cl.
G03B 21/00 (2006.01)
G03B 21/20 (2006.01)
G03B 33/06 (2006.01)

(52) U.S. Cl.
CPC ........ G03B 21/2013 (2013.01); G03B 21/2073 (2013.01); G03B 33/06 (2013.01); G03B 21/2066 (2013.01)
USPC ........................................................ 353/31

(58) Field of Classification Search
CPC ........................ G02B 26/0841; G02B 26/0833
USPC ................................ 353/31; 359/223.1, 224.1
See application file for complete search history.

(56) References Cited

U.S. PATENT DOCUMENTS

2008/0212040 A1 9/2008 Aksyuk
2009/0009851 A1* 1/2009 Endo et al. .................... 359/292

FOREIGN PATENT DOCUMENTS

| JP | 09-230258 | 9/1997 |
|---|---|---|
| JP | 11-084271 | 3/1999 |
| JP | 2003-315791 | 11/2003 |
| JP | 2005-173357 | 6/2005 |
| JP | 2009-025514 | 2/2009 |
| JP | 2009-026742 | 2/2009 |
| JP | 2010-044272 | 2/2010 |
| JP | 2010-520515 | 6/2010 |

* cited by examiner

*Primary Examiner* — Thanh Luu
*Assistant Examiner* — Danell L Owens
(74) *Attorney, Agent, or Firm* — Cozen O'Connor

(57) ABSTRACT

An image projector has a light source emitting blue, green, and red illumination light, a digital micromirror device forming blue, green, and red images, and a projection system enlarging the images, and fulfills the formula $FP \leq 1/(2 \cdot \sin\{\sin^{-1}[1/(2 \cdot FI)] + \Delta\})$, where, when mirror surfaces forming pixels are referred to as pixel surfaces, mirror-reflected light on the pixel surface along the illumination axis is referred to as mirror-reflected light, and angles between, of the diffracted light produced as a result of the rays along the illumination axis being diffracted, the part traveling in a direction closest to the mirror-reflected light and the normal line to the image display surface is defined as diffraction angles $\beta B$, $\beta G$, and $\beta R$, then $\Delta$ represents the largest of the angles $\beta B$, $\beta G$, and $\beta R$, FI represents f-number of illumination light, and FP represents f-number of projection system.

20 Claims, 12 Drawing Sheets

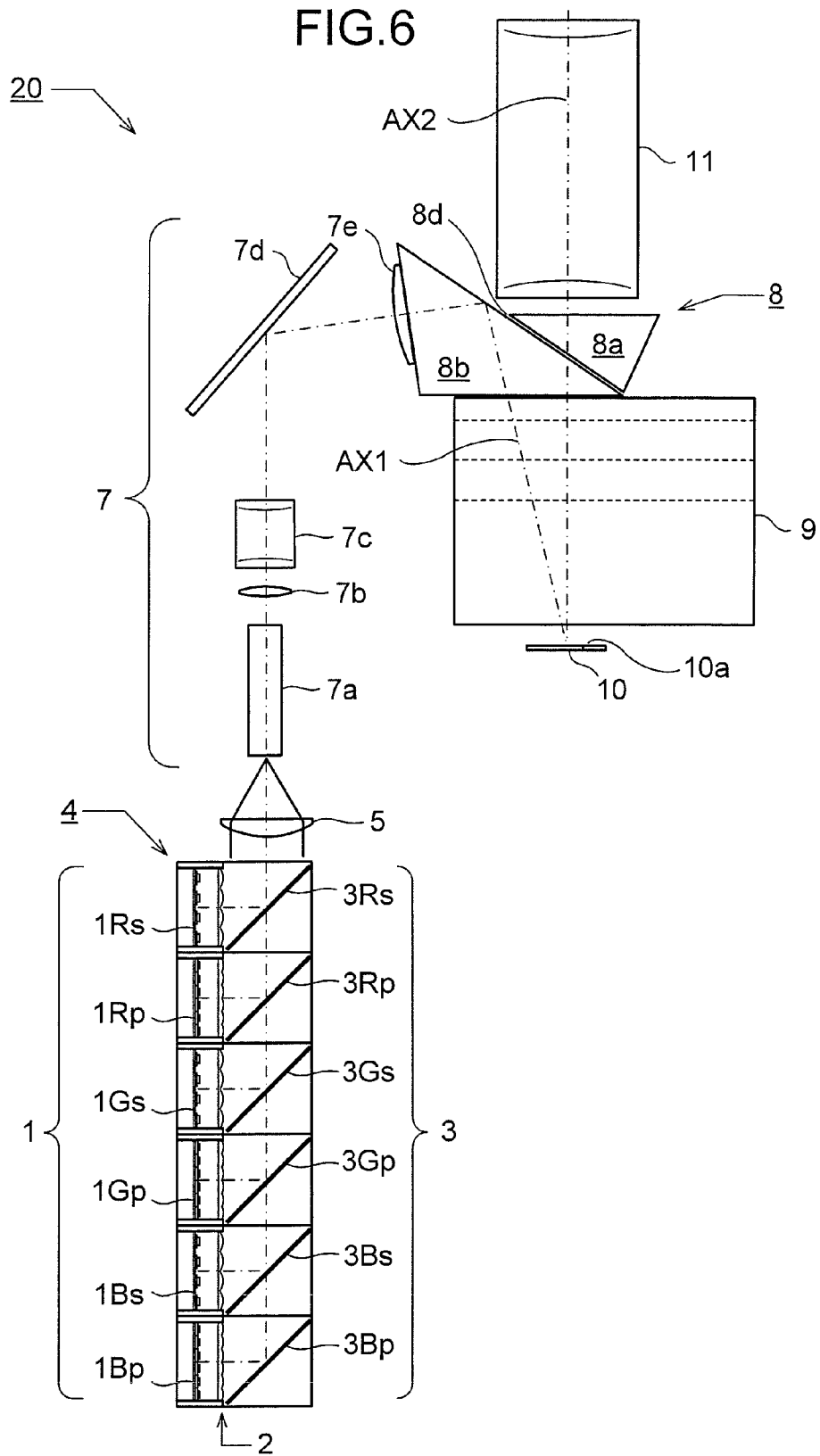

IMAGE PROJECTION APPARATUS

This application is based on Japanese Patent Application No. 2011-017533 filed on Jan. 31, 2011, the contents of which are hereby incorporated by reference.

BACKGROUND OF THE INVENTION

1. Field of the Invention

The present invention relates to image projection apparatus, and more particularly to color image projection apparatus provided with a digital micromirror device as a display device and, for example, a laser light source as a light source for illuminating its image display surface.

2. Description of Related Art

As display devices for use in image projection apparatus, there are known digital micromirror devices. A digital micromirror device has an image display surface composed of a plurality of minute mirrors; it controls the inclination of the individual mirror surfaces on the image display surface, thereby modulates the intensity of illumination light, and thereby forms an image. In a digital micromirror device, the turning on and off of each pixel is achieved, for example, by the rotation of a mirror surface through ±12° about a rotation axis at 45° to each side of the image display surface.

Recent years have seen development of digital micromirror devices with increasingly high definition. As digital micromirror devices are given increasingly high definition, they come to have increasingly small pixel pitches, and this makes the influence of diffraction accordingly less negligible. Specifically, the smaller the pixel pitch, the more a digital micromirror device acts as a diffraction grating, and this spreads the reflected light to a degree commensurate with the diffraction angle, resulting in lower light transfer efficiency. The influence is particularly great in cases where a laser light source is used.

As one technology for reducing the influence of diffraction in digital micromirror devices, Patent Document 1 listed below proposes a laser irradiation apparatus for laser machining. In this laser irradiation apparatus, to prevent lowered light transfer efficiency ascribable to diffraction, the image display surface of a digital micromirror device is inclined at a predetermined angle to the optical axis of an objective lens. Here, combining an diffraction angle with a geometric reflection angle makes it possible to suppress the influence of diffraction.

Patent Document 1: JP-A-2010-44272

Unfortunately, however, it is difficult to apply the technology proposed in Patent Document 1 to image projection apparatus. This is because, in image projection apparatus, where proper imaging is expected over the entire screen, it is difficult to incline the digital micromirror device at an angle large enough to suppress the influence of diffraction. For this reason, no image projection apparatus have thus far been proposed in which consideration is given to the influence of diffraction at a digital micromirror device.

SUMMARY OF THE INVENTION

The present invention has been devised against the background discussed above, and aims to provide an image projection apparatus that suffers less light transfer loss with respect to a projection optical system and that produces a high-quality projection image.

According to one aspect of the present invention, an image projection apparatus is provided with a light source apparatus which emits blue, green, and red illumination light, a digital micromirror device which modulates the intensity of the blue, green, and red illumination light on an image display surface and which thereby forms blue, green, and red images, and a projection optical system which projects, while enlarging, the blue, green, and red images. Here, conditional formula (1) below is fulfilled:

$$FP \leq 1/(2 \cdot \sin\{\sin-1[1/(2 \cdot FI)] + \Delta\}) \quad (1)$$

where when the mirror surfaces forming pixels on the image display surface of the digital micromirror device are referred to as pixel surfaces, the reflected light produced as a result of the light ray along the illumination optical axis being mirror-reflected on the pixel surface is referred to as mirror-reflected light, the angle between, of the diffracted light produced as a result of the blue light ray along the illumination optical axis being diffracted on the digital micromirror device, the part traveling in a direction closest to the mirror-reflected light and the normal line to the image display surface is defined as a blue light diffraction angle $\beta B$, the angle between, of the diffracted light produced as a result of the green light ray along the illumination optical axis being diffracted on the digital micromirror device, the part traveling in a direction closest to the mirror-reflected light and the normal line to the image display surface is defined as a green light diffraction angle $\beta G$, and the angle between, of the diffracted light produced as a result of the red light ray along the illumination optical axis being diffracted on the digital micromirror device, the part traveling in a direction closest to the mirror-reflected light and the normal line to the image display surface is defined as a red light diffraction angle $\beta R$, then $\Delta$ represents the largest among the diffraction angles $\beta B$, $\beta G$, and $\beta R$, FI represents the f-number of the illumination light, and FP represents the f-number of the projection optical system.

According to another aspect of the present invention, an image projection apparatus is provided with a light source apparatus which emits blue, green, and red illumination light, a first digital micromirror device which modulates the intensity of the blue illumination light on the image display surface thereof and which thereby forms a blue image, a second digital micromirror device which modulates the intensity of the green illumination light on the image display surface thereof and which thereby forms a green image, a third digital micromirror device which modulates the intensity of the red illumination light on the image display surface thereof and which thereby forms a red image, a color mixing optical device which mixes the blue, green, and red images, and a projection optical system which projects, while enlarging, the blue, green, and red images exited from the color mixing optical device. Here, conditional formula (1) above is fulfilled.

BRIEF DESCRIPTION OF THE DRAWINGS

FIG. 6 is a side view showing an image projection apparatus as one embodiment of the invention;

DETAILED DESCRIPTION OF PREFERRED EMBODIMENTS

Embodiments and examples of image projection apparatus according to the present invention will be described below with reference to the accompanying drawings. Among different embodiments and examples, the same or equivalent parts are identified by the same reference signs, and no overlapping description will be repeated unless necessary.

How Diffraction Occurs in a Digital Micromirror Device (FIGS. 1 to 5)

Figure 1A:
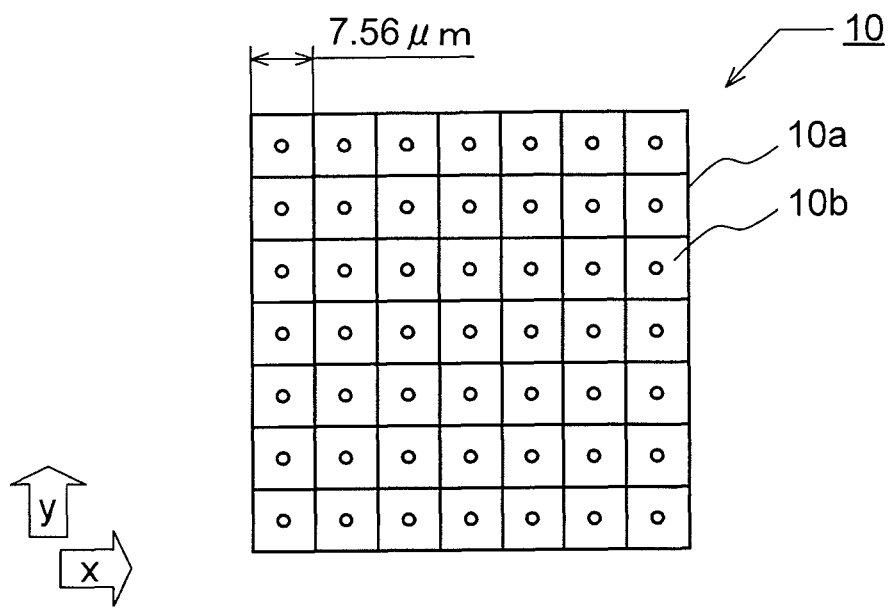
FIGS. 1A and 1B are diagrams showing the image display surface of a digital micromirror device and the diffraction pattern produced by it.
Figure 1B:
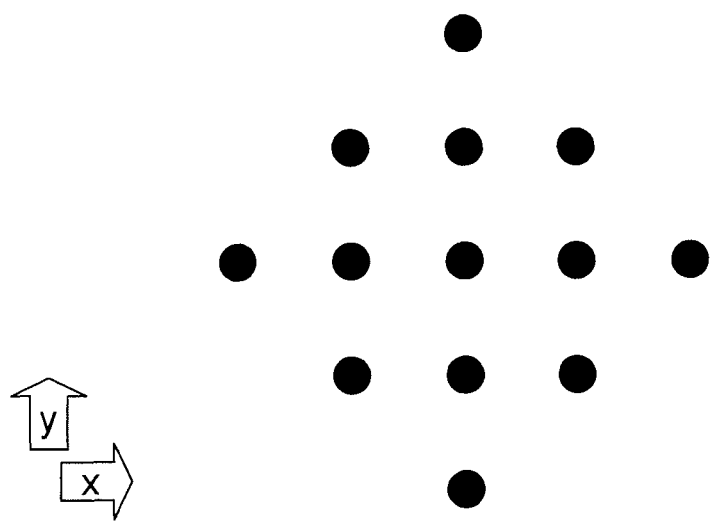

As shown in FIG. 1A, a digital micromirror device 10 has, on its image display surface 10a, pixel surfaces 10b which are mirror surfaces forming pixels respectively. Each pixel surface 10b is square in shape, has a rotation axis diagonally, and rotates through ±12° to display on and off (switch between on and off states). Illumination light illuminates the image display surface 10a from an oblique, 45°, direction perpendicular to the rotation axis (that is, from a direction at 45° to each side of the rectangular image display area formed by the image display surface 10a). Here, the digital micromirror device 10 acts as a diffraction grating and forms a diffraction pattern by diffraction-reflection (reflection caused by diffraction) as shown in FIG. 1B. That is, it produces diffracted light of different orders in the directions in which the pixels are arrayed, namely in the left/right and up/down directions (x-y directions).

Figure 2:
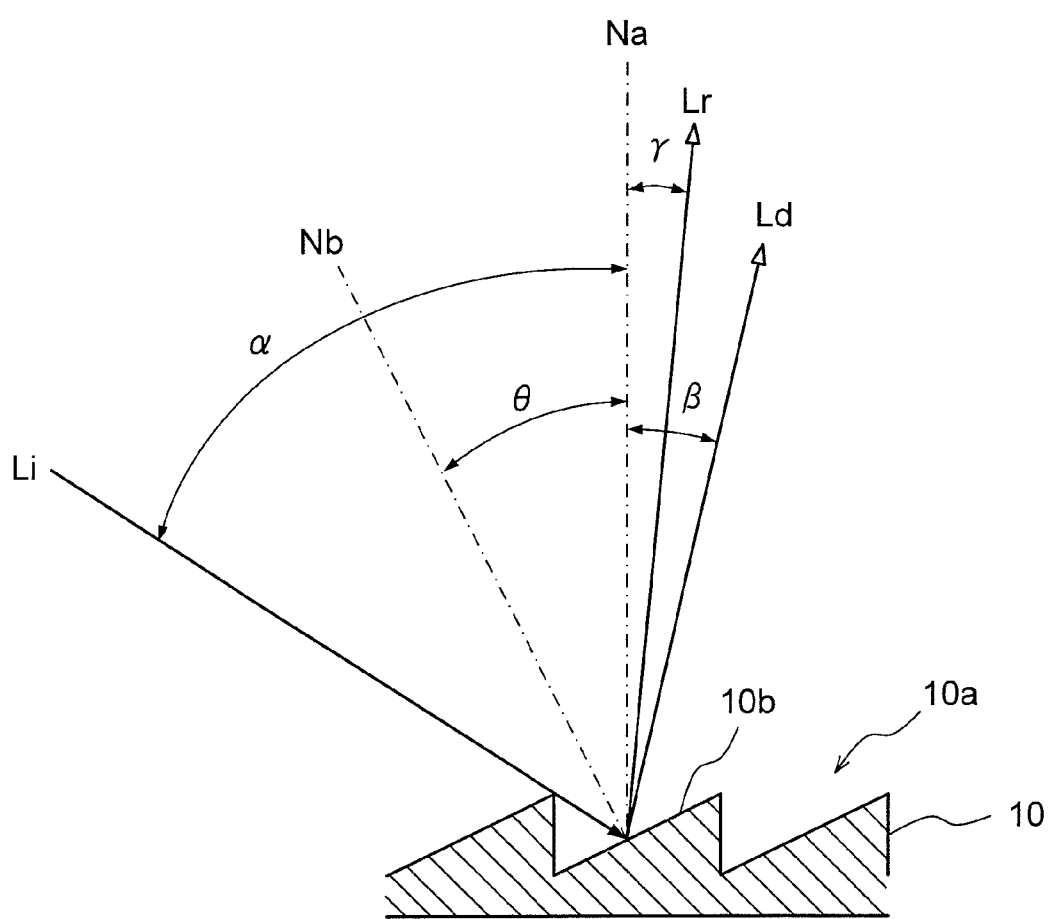
FIG. 2 is a sectional view schematically showing illumination light, mirror-reflected light, and diffracted light as observed when a digital micromirror device is regarded as a blazed diffraction grating.

The digital micromirror device 10, when seen from the direction of the rotation axis of the pixel surfaces 10b (that is, when seen on a sectional plane perpendicular to the rotation axis), can be regarded as a blazed diffraction grating as shown in FIG. 2. Here, when the incidence angle of the illumination light Li with respect to the image display surface 10a of the digital micromirror device 10 (Na representing the normal line to the image display surface 10a) is represented by α, and the inclination angle of the pixel surfaces 10b of the digital micromirror device 10 (Nb representing the normal line to the pixel surfaces 10b) is represented by θ, then the mirror-reflection angle γ of the mirror-reflected light Lr is given by the formula γ=α−2·θ (mirror-reflection meaning reflection occurring on a mirror surface). Moreover, when the pixel pitch (in the x-y directions) is represented by d, the wavelength is represented by γ, and the order of diffraction is represented by m, then the diffraction angle β of the diffracted light Ld is given by the formula $\beta=\sin^{-1}[\sin \alpha - m\cdot\lambda/(\sqrt{2}\cdot d)]$.

Figure 3A:
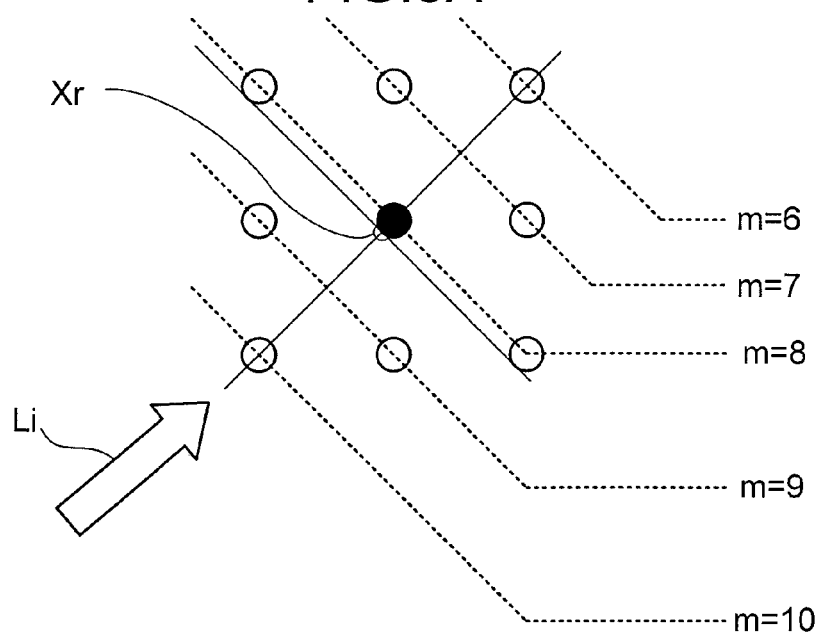
FIGS. 3A and 3B are diagrams showing the distribution of diffracted light of different orders when illumination light has a wavelength of 532 nm.
Figure 3B:
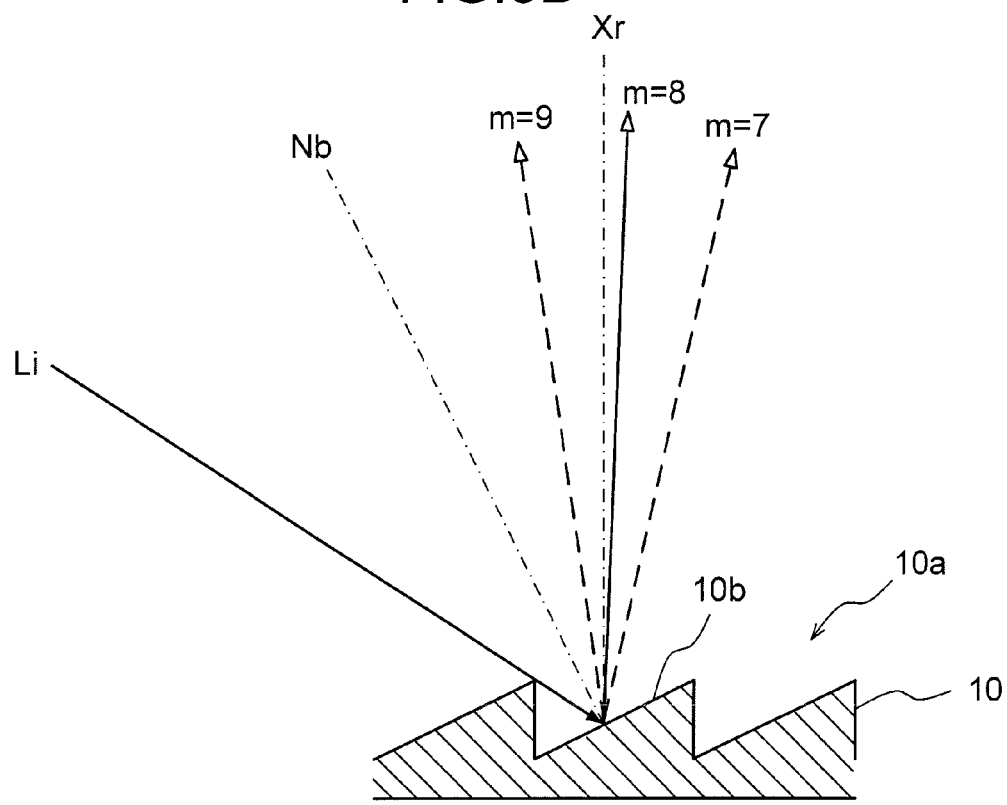

Here, the distribution of different orders of diffraction m and the diffracted light Ld (FIG. 2) in the incidence direction of the illumination light Li (that is, a direction diagonal with respect to pixels) is as shown in FIGS. 3A and 3B. FIG. 3A shows how diffraction occurs with the digital micromirror device 10 seen from in front, and FIG. 3B shows how diffraction occurs with the digital micromirror device 10 seen on a sectional plane perpendicular to the rotation axis of the pixel surfaces 10b. When the order of diffraction m is an odd number, no diffracted light Ld of an odd-numbered order appears on the mirror-reflected optical axis Xr (the optical axis of the mirror-reflected part) of the illumination light Li, thus the diffracted light Ld of an even-numbered order alone can coincide with the mirror-reflected optical axis Xr. The diffracted light Ld of different orders is reflected with energy corresponding to respective conditions of diffraction; when the diffracted light Ld of any order coincides with the part of the illumination light Li mirror-reflected on the pixels, the diffracted light Ld corresponding to that condition has concentrated energy. That is, when the mirror-reflection direction coincides with the diffraction direction of an even-numbered order, that is, when γ=β, energy concentrates in that direction and is reflected efficiently.

FIGS. 3A and 3B show how diffraction occurs in a case where the pixel pitch d=7.56 μm, the pixel inclination angle θ=12°, the illumination light Li incidence angle α=24°, and the wavelength λ=532 nm. In this case, the diffracted optical axis (the optical axis of the diffracted light) of an even-numbered order (namely, the diffracted light of order 8 (m=8)) is very close to the mirror-reflected optical axis Xr, the difference being about 0.5°. The diffracted light of order 8 is reflected approximately in the mirror-reflection direction, and 95% or more of energy concentrates on the diffracted light (indicated by solid dots) closest to the mirror-reflected optical axis Xr. The light beams of other orders of diffraction have almost no energy, and is reflected without being much influenced by diffraction.

Figure 4A:
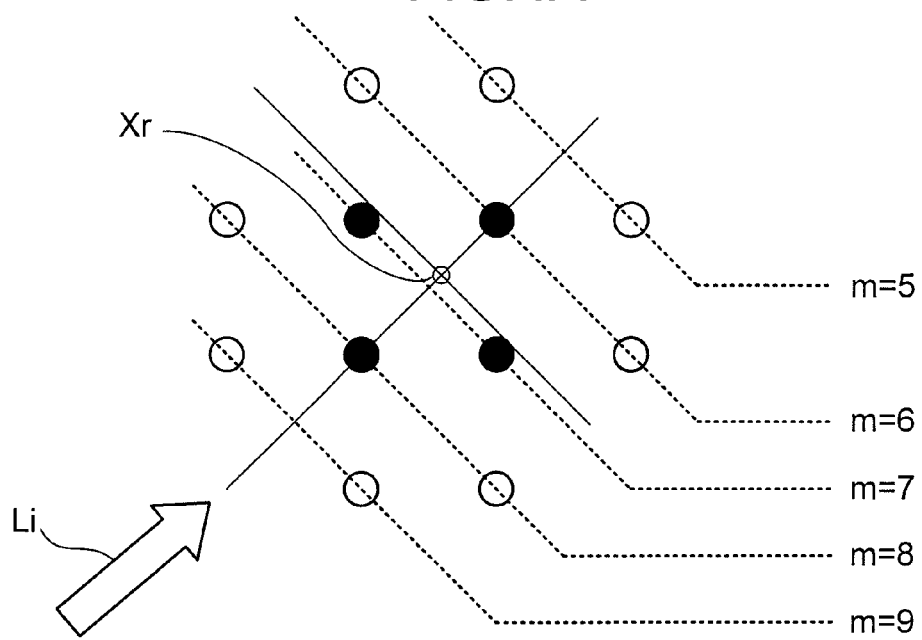
FIGS. 4A and 4B are diagrams showing the distribution of diffracted light of different orders when illumination light has a wavelength of 635 nm.
Figure 4B:
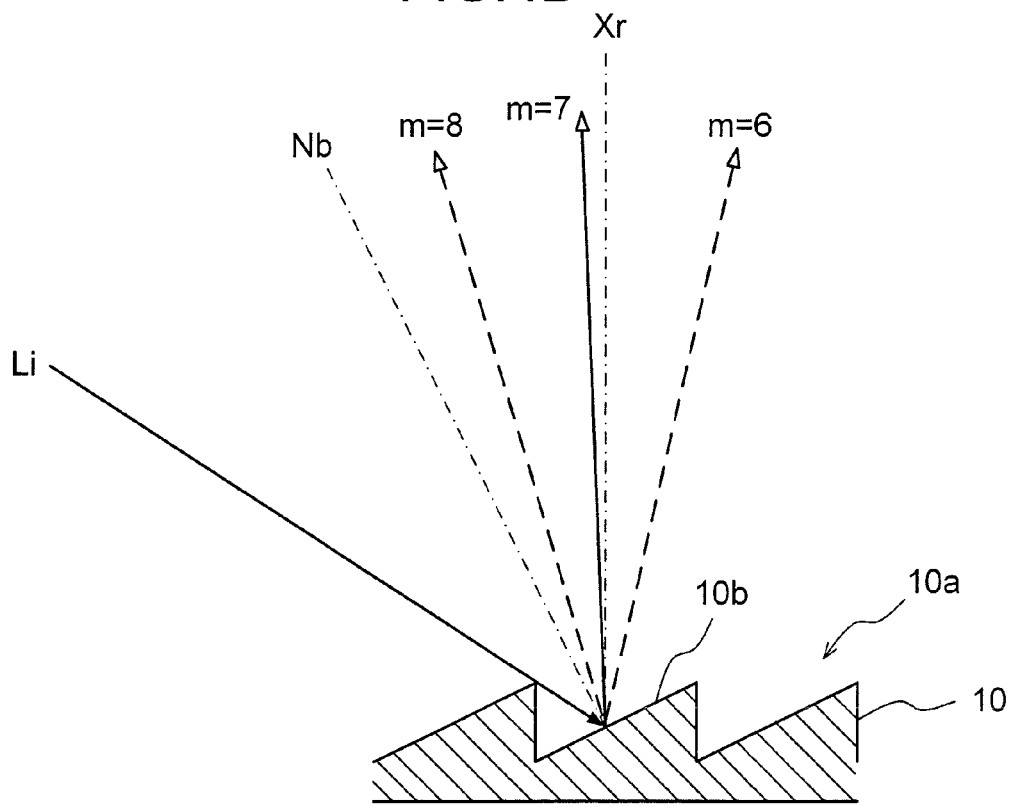

On the other hand, FIGS. 4A and 4B show how diffraction occurs in a case where the pixel pitch d=7.56 μm, the pixel inclination angle θ=12°, the illumination light Li incidence angle α=24°, and the wavelength λ=635 nm. FIG. 4A shows how diffraction occurs with the digital micromirror device 10 seen from in front, and FIG. 4B shows how diffraction occurs with the digital micromirror device 10 seen on a sectional plane perpendicular to the rotation axis of the pixel surfaces 10b. In FIG. 4B, the diffracted optical axis of an odd-numbered order (namely, the diffracted light of order 7 (m=7)) is close to the mirror-reflected optical axis Xr, the difference being 0.5°. In this case, however, as will be understood from FIG. 4A, no diffracted light of an odd-numbered order appears close to the mirror-reflected optical axis Xr, and thus the closest to the mirror-reflected optical axis Xr is the diffracted light of an even-numbered order, namely order 6 (m=6). Here, the diffracted light of order 6, which is close to but 2.9° apart from the mirror-reflected optical axis Xr, has 28.3% of energy; two spots of the diffracted light of order 7 are 3.4° apart from the mirror-reflected optical axis Xr and each have about 15.3% of energy; the diffracted light of order 8, which is 3.9° apart from the mirror-reflected optical axis Xr, has 8.3% of energy.

As described above, in a case where the pixel pitch d=7.56 μm, the pixel inclination angle θ=12°, and the illumination light Li incidence angle α=24°, when the wavelength λ=532 nm, reflection takes place with almost no diffusion from the direction of the mirror-reflected optical axis Xr; in contrast, when the wavelength λ=635 nm, diffraction causes reflection to take place with diffusion from the mirror-reflected optical axis Xr. In this way, depending on the wavelength, diffraction causes light beams with energy to travel in spread directions. To enable a projection optical system to achieve color display by projecting light of wavelengths corresponding to red, green, and blue efficiently onto a screen, the f-number needs to be bright enough to capture the most spread light beam. The diffracted light has more energy the closer to the mirror-reflected optical axis Xr. Accordingly, for efficient light transfer in the projection optical system, it is important that at least the diffracted light of the even-numbered order closest to the mirror-reflected optical axis Xr pass through the projection optical system.

In FIG. 2, with respect to blue, green, and red light, of their diffraction angles β of the diffracted light Ld of the even-numbered order closest to the mirror-reflection angle γ, the one β with the greatest absolute value is represented by Δ. For example, in an image projection apparatus where the pixel pitch d=7.56 μm, the pixel inclination angle θ=12°, and the illumination light Li incidence angle α=24°, and in addition the wavelength of blue laser light λB=445 nm, the wavelength of green laser light λG=532 nm (the condition shown in FIG. 3), and the wavelength of red laser light λR=635 nm (the condition shown in FIG. 4), the diffraction angles β of even-numbered orders are as shown in Table 1 below.

TABLE 1

|  | 445 nm (λB) | 532 nm (λG) | 635 nm (λR) |
| --- | --- | --- | --- |
| Order 4 | 13.9° | 12.0° | 9.7° |
| Order 6 | 9.0° | 6.2° | 2.9° |
| Order 8 | 4.2° | 0.5° | −3.9° |
| Order 10 | −0.5° | −5.2° | −10.8° |
| Order 12 | −5.3° | −11.0° | −17.8° |

As will be understood from Table 1, the closest to the mirror-reflected optical axis Xr is, at the wavelength of 445 nm, the diffracted light of order 10 with −0.5°; at the wavelength of 532 nm, the diffracted light of order 8 with 0.5°; and at the wavelength of 635 nm, the diffracted light of order 6 with 2.9°. Of these diffraction angles, the one with the greatest absolute value is 2.9° at the wavelength of 635 nm of red light. Hence Δ=2.9°, and the projection optical system needs to be given such an f-number as to transfer that diffracted light up to the screen.

Here, when the f-number of the illumination light is represented by FI, then the spread angle θI of the illumination light with respect to the principal ray is given by the formula $\theta I = \sin^{-1}[1/(2 \cdot FI)]$. When the f-number of the projection optical system is represented by FP, then the angle θP across which the projection optical system can capture is given by the formula $\theta P = \sin^{-1}[1/(2 \cdot FP)]$. When the angle θP is at least equal to or larger than θI+Δ, the diffracted light closest to the mirror-reflected optical axis Xr can be captured, and thus a considerable amount of energy can be captured. That is, conditional formula (1) below, which is derived from the formula θP≥θI+Δ, needs to be fulfilled. Fulfilling conditional formula (1) makes it possible to give the projection optical system an f-number smaller than that of the illumination light by an amount corresponding to the diffraction angle in the digital micromirror device 10, and thereby to reduce light transfer loss.

$\theta P \geq \theta I + \Delta$ $\sin^{-1}[1/(2 \cdot FP)] \geq \sin^{-1}[1/(2 \cdot FI)] + \Delta$ $1/(2 \cdot FP) \geq \sin\{\sin^{-1}[1/(2 \cdot FI)] + \Delta\}$ $$FP \leq 1/(2 \cdot \sin\{\sin^{-1}[1/(2 \cdot FI)] + \Delta\}) \quad (1)$$

Hence, it is preferable that the image projection apparatus fulfill conditional formula (1) below.

$$FP \leq 1/(2 \cdot \sin\{\sin^{-1}[1/(2 \cdot FI)] + \Delta\}) \quad (1)$$

where
when
the mirror surfaces forming pixels on the image display surface of the digital micromirror device are referred to as pixel surfaces,
the reflected light produced as a result of the light ray along the illumination optical axis being mirror-reflected on the pixel surface is referred to as mirror-reflected light,
the angle between, of the diffracted light produced as a result of the blue light ray along the illumination optical axis being diffracted on the digital micromirror device, the part traveling in a direction closest to the mirror-reflected light and the normal line to the image display surface is defined as a blue light diffraction angle βB,
the angle between, of the diffracted light produced as a result of the green light ray along the illumination optical axis being diffracted on the digital micromirror device, the part traveling in a direction closest to the mirror-reflected light and the normal line to the image display surface is defined as a green light diffraction angle βG, and
the angle between, of the diffracted light produced as a result of the red light ray along the illumination optical axis being diffracted on the digital micromirror device, the part traveling in a direction closest to the mirror-reflected light and the normal line to the image display surface is defined as a red light diffraction angle βR,
then
Δ represents the largest among the diffraction angles βB, βG, and βR,
FI represents the f-number of the illumination light, and
FP represents the f-number of the projection optical system.

For example, when FI=3.0, since Δ=2.9°, $1/(2 \cdot \sin\{\sin^{-1}[1/(2 \cdot FI)] + \Delta\}) = 2.3$ Accordingly, when FP≤2.3, efficient energy transfer in the projection optical system is possible.

While it is important that the diffracted light of the even-numbered order closest to the mirror-reflected optical axis Xr be captured, the diffracted light of an even-numbered order is farthest away from the mirror-reflected optical axis Xr when the diffracted light of an odd-numbered order coincides with the mirror-reflected optical axis Xr on the sectional plane shown in FIG. 2. In this condition, although energy diffusion is large, if the diffracted light of a close even-numbered order can be captured, a considerable amount of energy can be captured in the projection optical system.

Here, when the diffraction angle of the odd-numbered order is represented by $\beta_{2 \cdot k + 1}$ and the diffraction angle of the even-numbered order is represented by $\beta_{2 \cdot k}$, then $\sin \beta_{2 \cdot k + 1} = \sin \alpha - (2 \cdot k + 1) \cdot \lambda/(\sqrt{2} \cdot d)$ $\sin \beta_{2 \cdot k} = \sin \alpha - (2 \cdot k) \cdot \lambda/(\sqrt{2} \cdot d)$ hold. Approximating $\beta \approx 0$ gives their difference $\delta$ as $$\delta = \beta_{2 \cdot k} - \beta_{2 \cdot k+1} \approx \lambda/(\sqrt{2} \cdot d)$$

The value of $\delta$, which indicates how far the diffracted light of the even-numbered order is away from the mirror-reflected optical axis Xr, depends on the wavelength $\lambda$ and the pixel pitch d. Thus, in a case where digital micromirror devices 10 having the same pitch for blue, green, and red are used, or in a case where a single digital micromirror device 10 is used for display on a time-division basis, the value of $\delta$ is greatest with red light having the greatest wavelength $\lambda$, and accordingly the projection optical system needs to capture light corresponding to $\delta$ at the wavelength $\lambda R$ of red.

So long as the angle $\theta P$ is at least equal to or larger than $\theta I + \delta + \gamma$, the diffracted light of a close even-numbered order can be captured, and thus a considerable amount of energy can be captured. That is, it is necessary to fulfill conditional formula (2) below, which is derived from $\theta P \geq \theta I + \delta + \gamma$.

$$\theta P \geq \theta I + \delta + \gamma$$

$$\sin^{-1}[1/(2 \cdot FP)] \geq \sin^{-1}[1/(2 \cdot FI)] + \lambda R/(\sqrt{2} \cdot d) + \gamma$$

$$1/(2 \cdot FP) \geq \sin\{\sin^{-1}[1/(2 \cdot FI)] + \lambda R/(\sqrt{2} \cdot d) + \gamma\}$$

$$FP \leq 1/(2 \cdot \sin\{\sin^{-1}[1/(2 \cdot FI)] + \lambda R/(\sqrt{2} \cdot d) + \gamma\}) \quad (2)$$

Hence, it is preferable that the image projection apparatus fulfill conditional formula (2) below.

$$FP \leq 1/(2 \cdot \sin\{\sin^{-1}[1/(2 \cdot FI)] + \lambda R/(\sqrt{2} \cdot d) + \gamma\}) \quad (2)$$

where d represents the pixel pitch of the digital micromirror device;

$\lambda R$ represents the wavelength of red light;

$\gamma$ represents the angle between the mirror-reflected light and the normal line to the image display surface;

FI represents the f-number of the illumination light; and

FP represents the f-number of the projection optical system.

Consider a case where, as mentioned previously, the pixel pitch d=7.56 μm, the pixel inclination angle $\theta$=12°, the illumination light Li incidence angle $\alpha$=24°, the wavelength of green laser light $\lambda G$=532 nm, the wavelength of red laser light $\lambda R$=635 nm, the wavelength of blue laser light $\lambda B$=445 nm, and FI=3.0. The value of $\delta \approx \lambda/(\sqrt{2} \cdot d)$ is $\delta \approx 2.38°$ for blue light, $\delta \approx 2.85°$ for green light, and $\delta \approx 3.40°$ for red light, and thus the difference in diffraction angle between the odd-numbered and even-numbered orders is greatest with red light having the greatest wavelength $\lambda$. Accordingly, when the diffracted light of an even-numbered order can be captured in the wavelength condition of red light, the diffracted light of the even-numbered order can be captured for the other colors as well, and thus a considerable amount of energy can be captured.

Moreover, in that condition, $\delta \approx \lambda/(\sqrt{2} \cdot d)=3.40°$ and $\gamma=0°$, and therefore, when F I=3.0, $$1/(2 \cdot \sin\{\sin^{-1}[1/(2 \cdot FI)] + \lambda/(\sqrt{2} \cdot d) + \gamma\})=2.22$$

Thus, when FP≤2.22, efficient energy transfer in the projection optical system is possible.

In a similar condition where only the illumination light Li incidence angle $\theta$ differs, namely when the pixel pitch d=7.56 μm, the pixel inclination angle $\theta$=12°, the illumination light Li incidence angle $\alpha$=26°, the wavelength of blue laser light $\lambda B$=445 nm, the wavelength of green laser light $\lambda G$=532 nm, the wavelength of red laser light $\lambda R$=635 nm, and FI=3.0, the value of $\delta$ at the wavelength of red is $\delta \approx \lambda/(\sqrt{2} \cdot d)=3.40°$, and in this condition, $\gamma = 26 - 2 \times 12 = 2°$. Hence, $$1/(2 \cdot \sin\{\sin^{-1}[1/(2 \cdot FI)] + \lambda/(\sqrt{2} \cdot d) + \gamma\})=1.93$$

For efficient energy transfer in the projection optical system, it is necessary that FP≤1.93, and the projection optical system needs to be so much brighter as to allow for the angle difference between the mirror-reflected optical axis Xr and the normal line Na to the display surface of the digital micromirror device 10.

Figure 5A:
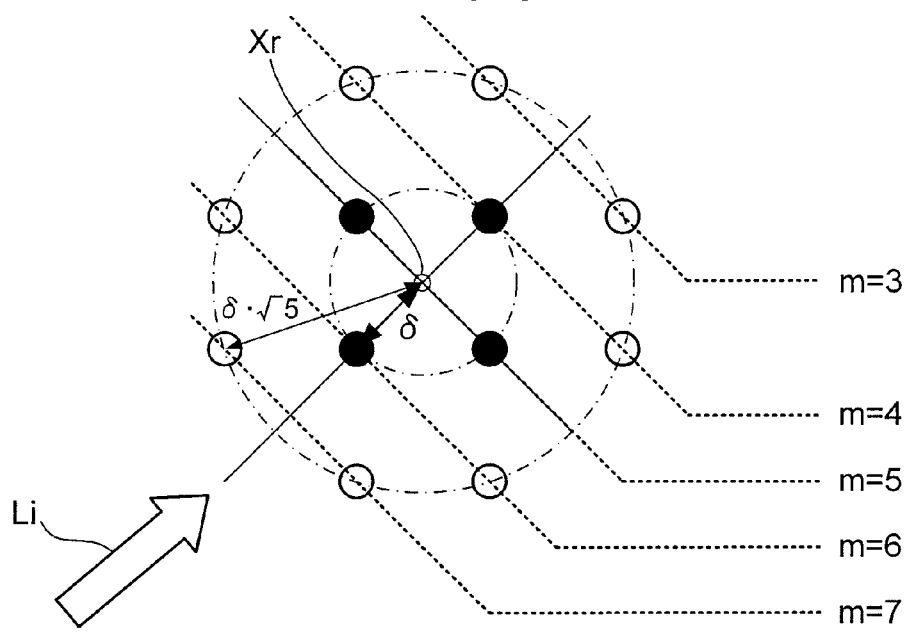
FIGS. 5A and 5B are diagrams showing the distribution of diffracted light of different orders when illumination light has a wavelength of 635 nm and the diffracted light of an odd-numbered order coincides with the mirror-reflected optical axis.
Figure 5B:
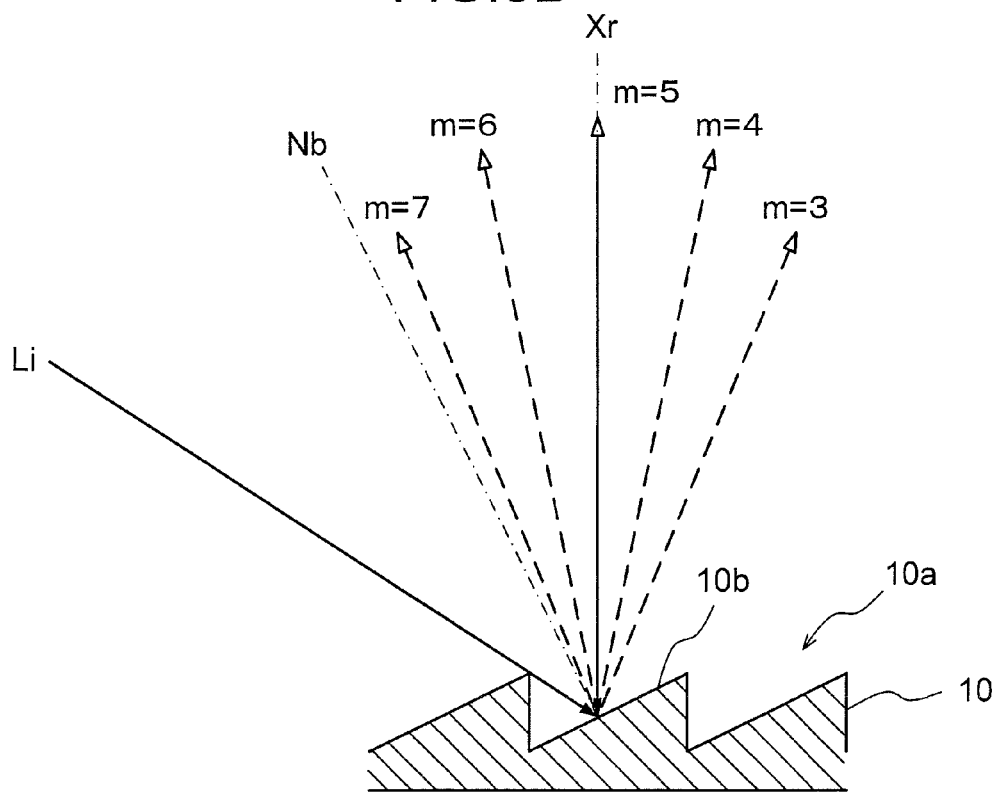

FIGS. 5A and 5B show how diffraction occurs in a case where the diffracted light of an odd-numbered order coincides with the mirror-reflected optical axis Xr as seen on the sectional plane shown in FIG. 2 and where the pixel pitch d=5.52 μm, the pixel inclination angle $\theta$=12°, the illumination light Li incidence angle $\alpha$=24°, and the wavelength $\lambda$=635 nm. FIG. 5A shows how diffraction occurs with the digital micromirror device 10 seen from in front, and FIG. 5B shows how diffraction occurs with the digital micromirror device 10 seen on a sectional plane perpendicular to the rotation axis of the pixel surfaces 10*b*.

The four diffracted light spots (solid dots) on the smaller dash-and-dot-line circle each have 16.4% of energy, and by capturing these four diffracted light spots, 65% of energy can be captured. Here, $\delta=0.635/(\sqrt{2} \cdot 5.52) \approx 4.66°$ and $\gamma=0°$; thus, for example, when the f-number of the illumination light is 5, then $\theta I = \sin^{-1}[1/(2 \cdot 5)] \approx 5.74°$, and hence $\theta P \geq 10.4°$, that is, $FP \geq 1/[2 \cdot \sin(10.4°)] \approx 2.77$.

The eight diffracted light spots (hollow dots) on the larger dash-and-dot-line circle each have 1.8% of energy, and by additionally capturing these eight diffracted light spots, 80% of energy can be captured. The angle range of the larger dash-and-dot-line circle is, as shown in FIG. 5A, approximately $\sqrt{5} \cdot \delta$, and the f-number of a projection optical system that captures diffracted light in that range is given by the following general formula.

$$FP = 1/(2 \cdot \sin\{\sin^{-1}[1/(2 \cdot FI)] + (\sqrt{5} \cdot \lambda)/(\sqrt{2} \cdot d) + \gamma\})$$

In the example shown in FIGS. 5A and 5B, $\sqrt{5} \cdot \delta \approx 10.42°$. Thus, likewise, when the f-number of the illumination light is 5, then $\theta I = \sin^{-1}[1/(2 \cdot 5)] \approx 5.74°$ and $\gamma=0°$, and hence the angle across which the projection optical system captures diffracted light within the larger dash-and-dot-line circle is $\theta P \approx 16.16°$, that is, $FP=1/[2 \cdot \sin(16.16°)] \approx 1.8$. Capturing diffracted light outside this range requires that the capturing angle of the projection optical system be further increased by as much as 6.5°; doing so, however, only achieves an approximately 6% increase in energy while making the projection optical system large, heavy, expensive, and difficult to design, and thus proves to be not very efficient. Thus, it is preferable that the capturing range of the projection optical system be set within the range of the larger dash-and-dot-line circle in FIG. 5A.

Accordingly, it is preferable that the image projection apparatus fulfills conditional formula (3) below.

$$FP \geq 1/(2 \cdot \sin\{\sin^{-1}[1/(2 \cdot FI)] + (\sqrt{5} \cdot \lambda R)/(\sqrt{2} \cdot d) + \gamma\}) \quad (3)$$

where d represents the pixel pitch of the digital micromirror device;

$\lambda R$ represents the wavelength of red light;

$\gamma$ represents the angle between the mirror-reflected light and the normal line to the image display surface;

FI represents the f-number of the illumination light; and

FP represents the f-number of the projection optical system.

Image Projection Apparatus as One Embodiment (FIGS. 6-12)

FIG. 6 shows an image projection apparatus embodying the invention. The image projection apparatus 20 is composed of a laser light source unit 4, a condenser lens 5, an illumination optical system 7, a TIR (total internal reflection) prism unit 8, a color prism unit 9, a digital micromirror device 10, a projection optical system 11, etc. (AX1 representing the illumination optical axis and AX2 representing the projection optical axis). FIG. 6 shows the overall construction of the image projection apparatus 20 as seen from a direction parallel to the rotation axis of the pixels of the digital micromirror device. The laser light source unit 4 is composed of a semiconductor laser array 1 (FIG. 8), a collimator lens array 2 (FIG. 9), an optical path integrating mirror 3, etc. The illumination optical system 7 is composed of a rod integrator 7a, a focusing lens 7b, a relay optical system 7c, a deflecting mirror 7d, an entrance lens 7e, etc. The TIR prism unit 8 is composed of a first prism 8a, a second prism 8b, etc.

Figure 7:
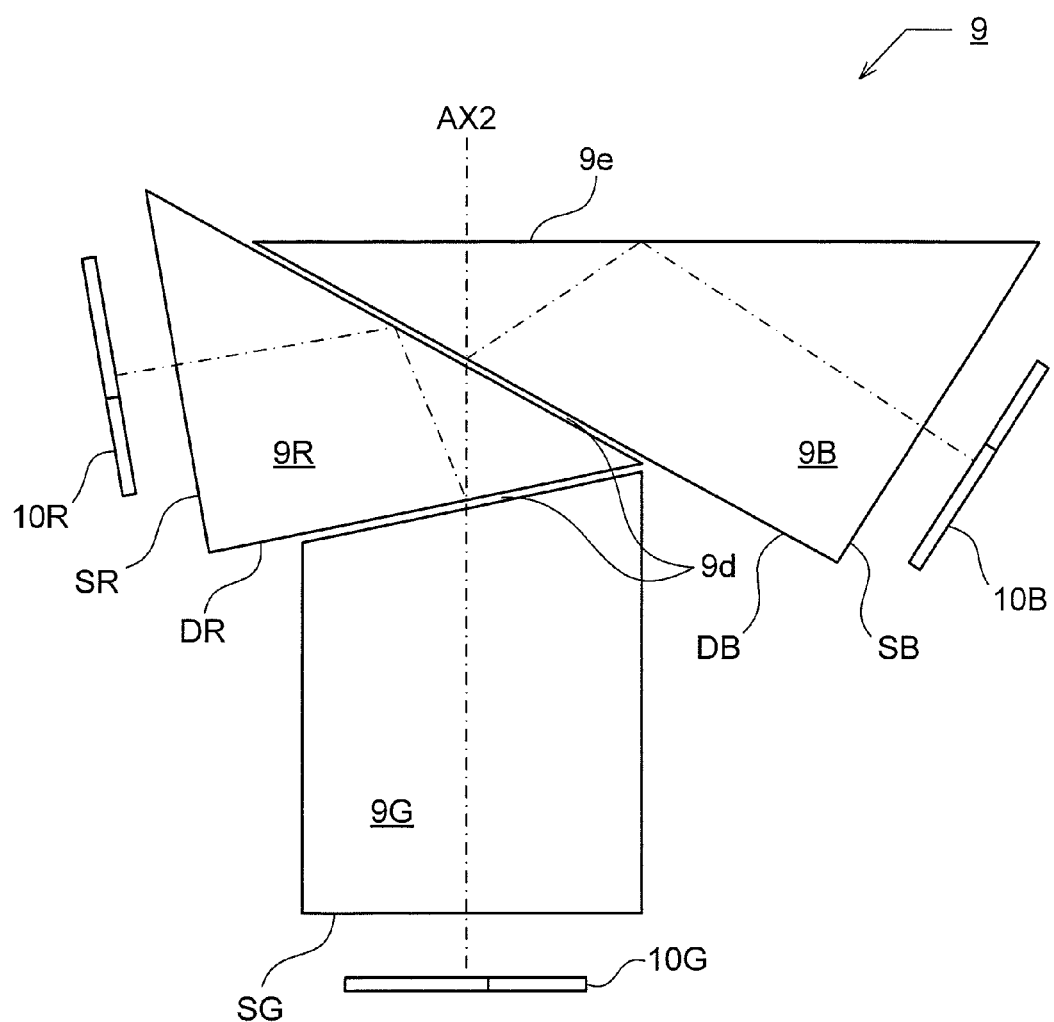
FIG. 7 is a front view of a color prism unit provided in an image projection apparatus.

FIG. 7 shows the color prism unit 9 as seen from above its top face, which is perpendicular to the rotation axis of the pixels of the digital micromirror device. As will be understood from FIG. 7, the color prism unit 9 is composed of a red prism 9R, a green prism 9G, a blue prism 9B, etc. As the digital micromirror device 10, there are provided digital micromirror devices 10R, 10G and 10B for red, green, and blue respectively.

Figure 8:
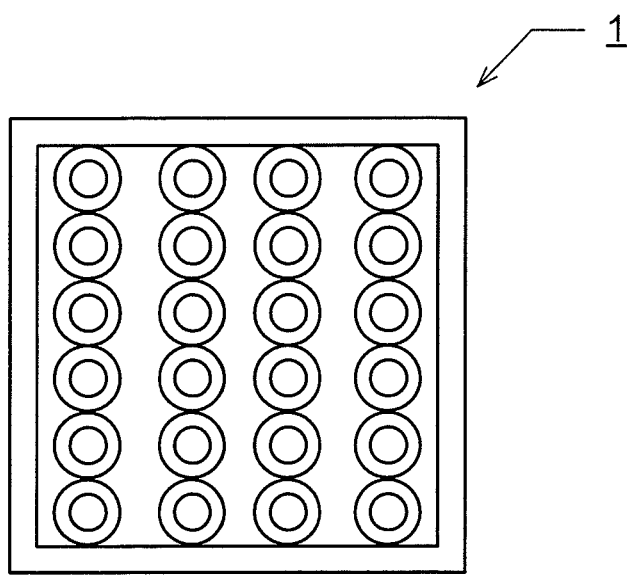
FIG. 8 is a plan view of a semiconductor laser array provided in a laser light source unit.
Figure 9:
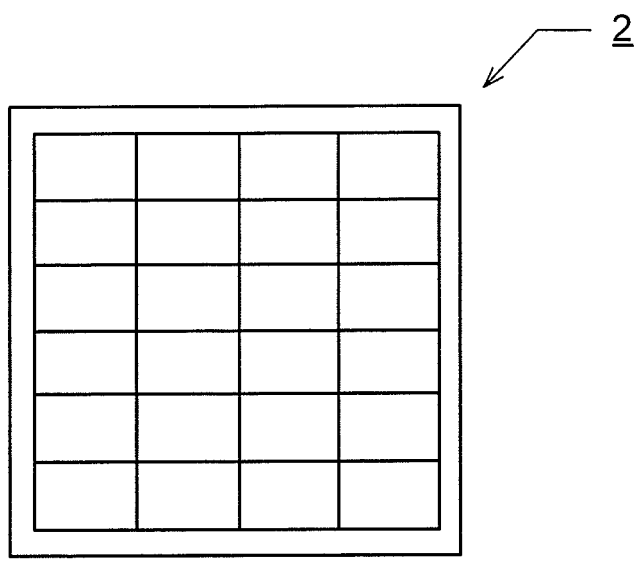
FIG. 9 is a plan view of a collimator lens array provided in a laser light source unit.

The laser light source unit (light source apparatus) 4 incorporates three types of semiconductor laser arrays 1, namely blue semiconductor laser arrays (blue laser light sources) 1Bs and 1Bp of a wavelength of 445 nm, green semiconductor laser arrays (green laser light sources) 1Gs and 1Gp of a wavelength of 532 nm, and red semiconductor laser arrays (red laser light sources) 1Rs and 1Rp of a wavelength of 635 nm, and further incorporates six types of optical path integrating mirrors 3, namely mirrors 3Bs and 3Bp for blue, mirrors 3Gs and 3Gp for green, and mirrors 3Rs and 3Rp for red. The semiconductor lasers constituting the semiconductor laser array 1 are so arranged that the polarizing characteristics with respect to the optical path integrating mirror 3 are uniform for each color. Moreover, since semiconductor lasers emit a light beam with a wider radiation angle in one direction, as shown in FIG. 8, the semiconductor lasers are located at a greater pitch in one direction corresponding to the widened radiation angle. As shown in FIG. 9, the collimator lens array 2 is so formed as to have an aperture shape corresponding to the arrangement of the semiconductor laser array 1.

In the laser light source unit 4, two semiconductor laser arrays for each color, that is, a total of six laser arrays 1Rs, 1Rp, 1Gs, 1Gp, 1Bs, and 1Bp, are used. The two semiconductor laser arrays 1 for each color are arranged in such a relationship that their respective polarization directions are perpendicular to each other. That is, there are arranged a blue P-polarized light semiconductor laser array 1Bp, a blue S-polarized light semiconductor laser array 1Bs, a green P-polarized light semiconductor laser array 1Gp, a green S-polarized light semiconductor laser array 1Gs, a red P-polarized light semiconductor laser array 1Rp, and a red S-polarized light semiconductor laser array 1Rs in this order.

Figure 10:
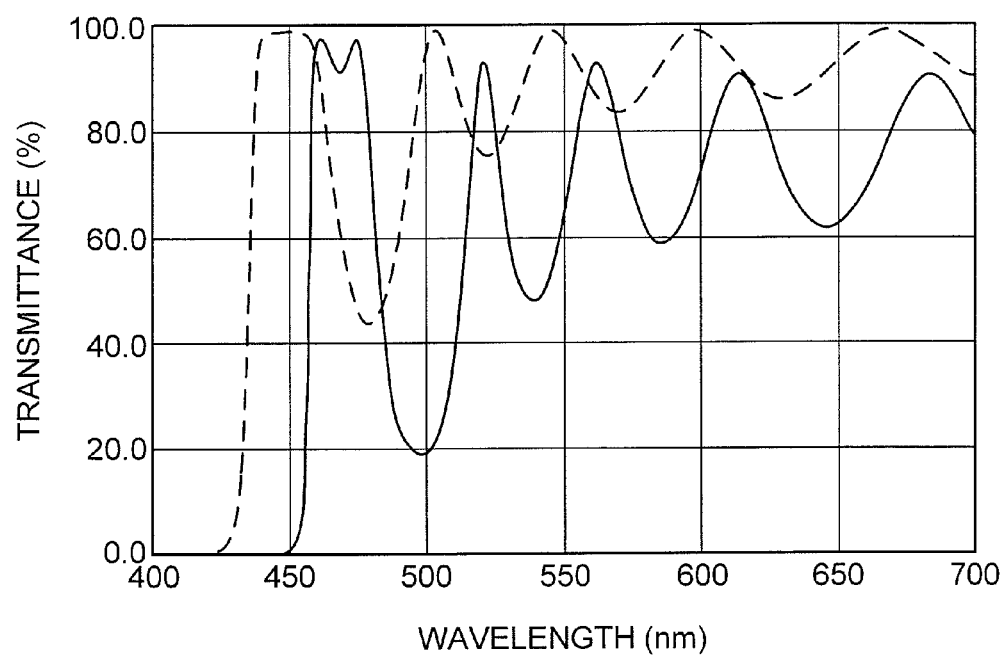
FIG. 10 is a graph showing the polarization separation characteristics of a blue-band PBS mirror provided in a laser light source unit.
Figure 11:
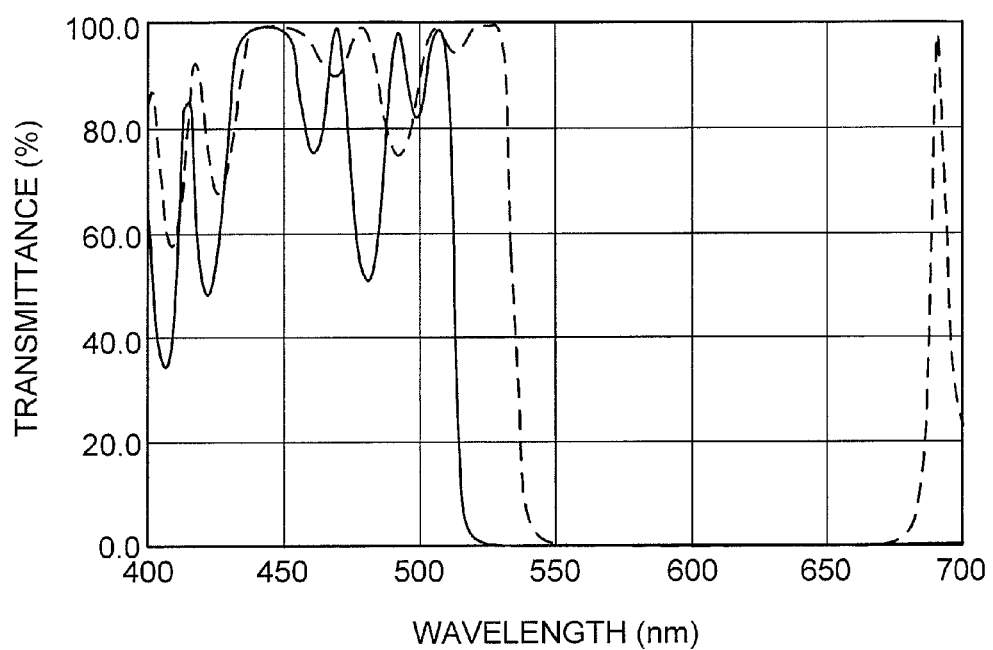
FIG. 11 is a graph showing the polarization separation characteristics of a green-band PBS mirror provided in a laser light source unit.
Figure 12:
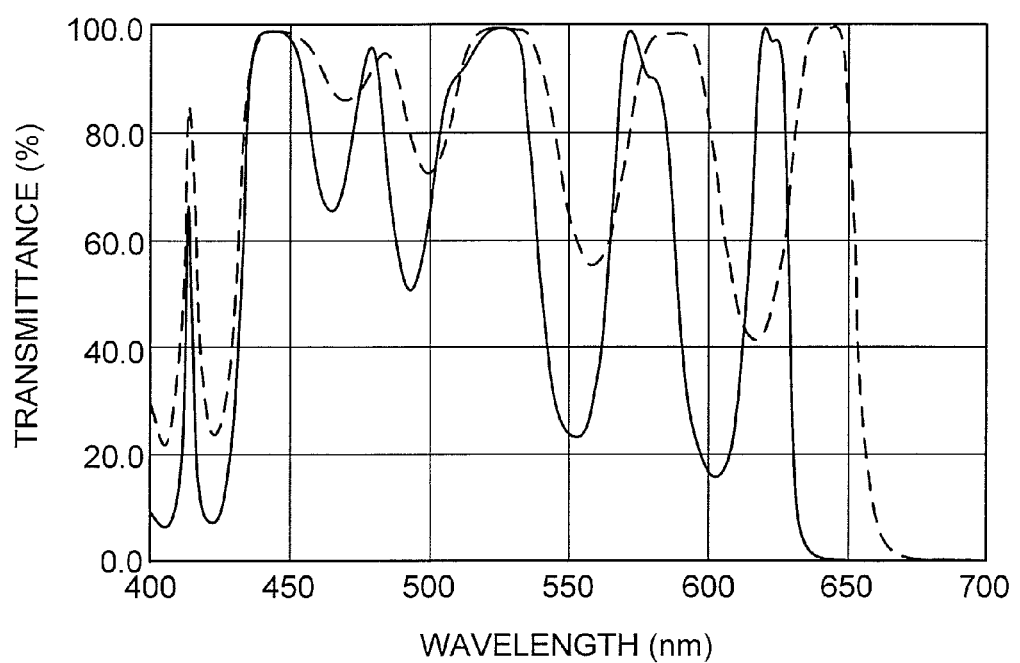
FIG. 12 is a graph showing the polarization separation characteristics of a red-band PBS mirror provided in a laser light source unit.

The light beam emanating from the semiconductor laser array 1 is formed into a substantially parallel light beam by the collimator lens array 2, and then strikes the optical path integrating mirror 3. A blue P-polarized light beam is reflected on the blue-reflecting mirror 3Bp, and is then mixed with a blue S-polarized light beam on the blue-band PBS (polarizing beam splitter) mirror 3Bs having characteristics as shown in FIG. 10 (the solid line indicating S-polarized light and the broken line indicating P-polarized light) to become blue light. The blue light is mixed with a green P-polarized light beam on the green-reflecting blue-transmitting mirror 3Gp, and is then mixed with a green S-polarized light beam on the green-band PBS blue-transmitting mirror 3Gs having characteristics as shown in FIG. 11 (the solid line indicating S-polarized light and the broken line indicating P-polarized light) to become cyan light. The cyan light is mixed with a red P-polarized light beam on the red-reflecting green/blue-transmitting mirror 3Rp, and is then mixed with a red S-polarized light beam on the red-band PBS green/blue-transmitting mirror 3Rs having characteristics as shown in FIG. 12 (the solid line indicating S-polarized light and the broken line indicating P-polarized light) to become white light. The mixed white light is condensed by the condenser lens 5, and enters the rod integrator 7a. The mixed white light may instead be shone into a fiber so as to be shone into the rod integrator 7a via the fiber.

The use of a number of semiconductor lasers in the laser light source unit 4 constructed as described above results in the advantage of reduced speckles. Even when one or some of the lasers are defective and cease to emit light during use, they have little effect; this permits continued use, and facilitates maintenance. Another advantage is that variations in emission wavelength are averaged, resulting in little difference in color reproduction among light source blocks of different colors.

The optical path integrating mirror 3 uses dichroic mirrors and PBS mirrors to achieve color mixing and polarization mixing, and this makes the apparent number of light sources ⅙ (the number of blocks is 6). This helps obtain a bright light source without increasing the NA (numerical aperture) of the optical system. Moreover, the laser light is first formed into a substantially parallel light beam by the collimator lens array 2 and then shone into the dichroic mirrors and PBS mirrors, and this helps perform polarization mixing and color mixing efficiently with a small incidence angle distribution range. The laser light sources may have any other construction than specifically described above, and may have one of various well-known constructions.

The light that has entered the rod integrator 7a is internally reflected repeatedly to have an even light quantity distribution, and exits from the rod integrator 7a through its exit face at the other end. Immediately past the exit face, the focusing lens 7b is disposed, and further past, the relay optical system 7c is disposed. The light that has exited from the rod integrator 7a is directed by the focusing lens 7b efficiently into the relay optical system 7c, further travels via the deflecting mirror 7d and then via the entrance lens 7e disposed on the entrance side of the TIR prism unit 8 through the TIR prism unit 8 and then through the color prism unit 9, and eventually illuminates the digital micromirror device 10.

On the image display surface 10a of the digital micromirror device 10, through intensity modulation of the illumination light, a two-dimensional image is formed. The pixels of the digital micromirror device 10 have a rotation axis at 45° to each side of the rectangular image display area formed by the image display surface 10a, and rotate about the rotation axis through, for example, ±12° to display on and off (switch between on and off states). Only the light reflected on micromirrors (pixel surfaces 10b) in the on state travels through the TIR prism unit 8, the color prism unit 9, and the projection optical system 11, so that the image displayed on the digital micromirror device 10 is projected onto a screen (not shown) on an enlarged scale.

The TIR prism unit 8 is composed of the first prism 8a and the second prism 8b, each having substantially the shape of a triangular prism, and between the slant faces of these prisms, an air gap layer 8d is provided. The TIR prism unit 8 separates input and output light to and from the digital micromirror device 10. The illumination light emanating from the illumination optical system 7 enters the first prism 8a, and strikes the slant face constituting the air gap layer 8d at an incidence angle that fulfills the total reflection condition; the light is thus totally reflected there to enter the color prism unit 9.

The illumination light is decomposed by the color prism unit 9 into red, green, and blue light. As shown in FIG. 7, the color prism unit 9 has the blue prism 9B, the red prism 9R, and the green prism 9G arranged in this order, the former two having substantially the shape of a triangular prism and the latter having the shape of a block.

Between the blue prism 9B and the red prism 9R, there are provided a blue dichroic surface DB, which reflects blue light, and, contiguous to it, an air gap layer 9d. The air gap layer 9d is inclined relative to the projection optical axis AX2, and the plane including the projection optical axis AX2 and the normal line to the air gap layer 9d is perpendicular to the plane including the air gap layer 8d of the TIR prism unit 8 and the projection optical axis AX2.

Between the red prism 9R and the green prism 9G, there are provided a red dichroic surface DR, which reflects red light, and, contiguous to it, an air gap layer 9d. Here again, the air gap layer 9d is inclined relative to the projection optical axis AX2, and likewise the plane including the projection optical axis AX2 and the normal line to the air gap layer 9d is perpendicular to the plane including the normal line to the air gap layer 8d of the TIR prism unit 8 and the projection optical axis AX2. The inclination direction here, however, is opposite to that of the air gap layer 9d between the blue and red prisms 9B and 9R.

Of the illumination light that has entered the blue prism 9B through its entrance/exit face 9e, the blue light is reflected on the blue dichroic surface DB while the rest, that is, the green and red light, is transmitted through it. The blue light reflected on the blue dichroic surface DB is totally reflected on the entrance/exit face 9e of the blue prism 9B, and exits from the blue prism 9B through one of its side faces, namely the blue entrance/exit face SB, to illuminate the blue digital micromirror device 10B. Of the green and red light transmitted through the blue dichroic surface DB, the red light is reflected on the red dichroic surface DR, and the green light is transmitted through it. The red light reflected on the red dichroic surface DR is totally reflected on the air gap layer 9d contiguous to the blue dichroic surface DB, and exits from the red prism 9R through one of its side faces, namely the red entrance/exit face SR, to illuminate the red digital micromirror device 10R. The green light transmitted through the red dichroic surface DR exits from the green prism 9G through one of its side faces, namely the green entrance/exit face SG, to illuminate the green digital micromirror device 10G.

The blue projection light reflected on the blue digital micromirror device 10B strikes the blue entrance/exit face SB, is totally reflected on the entrance/exit face 9e of the blue prism 9B, and is then reflected on the blue dichroic surface DB. The red projection light reflected from the red digital micromirror device 10R strikes the red entrance/exit face SR, is totally reflected on the air gap layer 9d contiguous with the blue dichroic surface DB, is then reflected on the red dichroic surface DR, and is then transmitted through the blue dichroic surface DB. The green projection light reflected on the green digital micromirror device 10G strikes the green entrance/exit face SG, and is transmitted through the red dichroic surface DR and the blue dichroic surface DB.

The red, blue, and green light are mixed to have the same optical axis, exits from the blue prism 9B through its entrance/exit face 9e, and enters the TIR prism unit 8. This time, the projection light that has entered the TIR prism unit 8 does not fulfill the total reflection condition, and is thus transmitted through the air gap layer 8d, and is projected through the projection optical system 11 onto the screen.

Here, the projection optical system 11 is given such an f-number that it can capture the incoming light with consideration given to the spread ascribable to diffraction in the digital micromirror device 10, and this makes it possible to project the light of all colors efficiently onto the screen.

Although the embodiment described above adopts a three-panel design, a single-panel design may instead be adopted. Also in that case, the projection optical system 11 is given a similar f-number. In a single-panel design, no color prism unit 9 is provided, and instead a red/green/blue semiconductor laser array 1 is lit on a time-division basis. As the colors of light are switched sequentially, images of the corresponding colors are displayed on the digital micromirror device 10 and projected onto the screen one after the next. Switching the colors of light so fast that the human eye cannot recognize it allows the projected images to be recognized as a color image. Even in cases where LED (light-emitting diode) light sources are used as the light source apparatus, or where a white light source (such as a xenon lamp) is used in combination with a color wheel (disposed near the entrance face of the rod integrator 7a) with narrow emergent light wavelength bands, it is possible to reduce light transfer loss effectively. In a case where the light sources are not lasers and thus the light from the light sources has a spread of wavelengths, the formulae noted above are calculated, for example, by use of, for each color, the wavelength of the maximum intensity determined by multiplying the wavelength distribution of the light entering the digital micromirror device by relative luminous efficiency.

As described previously, in the image projection apparatus of the embodiment described above, conditional formula (1) is so set that, for all of blue, green, and red, the diffracted light of the even-numbered order closest to the mirror-reflection condition passes through the projection optical system. That is, conditional formula (1) sets the f-number of the projection optical system such that, of the diffracted light produced as a result of blue, green, and red illumination light being diffracted in the digital micromirror device, the part closest to the mirror-reflected light and having high energy is captured by the projection optical system. This makes efficient light transfer in the digital micromirror device possible. For example, in a case where laser light is used as an illuminating system, the illumination light has a comparatively large f-number; thus, slightly reducing the f-number of the projection optical system causes almost no problems ascribable to it. In such a construction, illumination is partially coherent, and thus the projection optical system has a lower limit resolution; however, below the frequency resolvable with coherent illumination, the MTF (modulation transfer function) is high. Thus, it is possible to realize an image projection apparatus that suffers little light transfer loss with respect to the projection optical system and that produces a high-quality projection image.

In the image projection apparatus of the embodiment described above, the light source apparatus has a blue laser light source, a green laser light source, and a red laser light source, and thus provides sufficiently bright illumination as, for example, a cinematography light source. As digital micromirror devices are given increasingly high definition, and thus as they come to have increasingly small pixel pitches, the influence of diffraction becomes accordingly less negligible, in particular in cases where laser light is used. The construction fulfilling conditional formula (1), however, reduces light transfer loss with respect to the projection optical system. Even in cases where LED light sources are used as the light source apparatus, or where a white light source (such as a xenon lamp) is used in combination with a color wheel with narrow emergent light wavelength bands, it is possible to reduce light transfer loss effectively.

In the image projection apparatus of the embodiment described above, the upper limit value of the f-number of the projection optical system is defined by the condition in which, on a sectional plane including the illumination optical axis, when the red mirror-reflected light is at the same angle as the diffracted light of an odd-numbered order, the part of the diffracted light closest to the mirror-reflected light passes through the projection optical system. That is, conditional formula (2) sets the f-number of the projection optical system such that, even when, for example, laser light sources are used, the main part of the diffracted light is captured by the projection optical system. This makes effective light transfer in the digital micromirror device possible. In this condition, the diffracted light closest to the mirror-reflected light is farthest away from the mirror-reflected light, and, for all of blue, green, and red, the diffracted light of the even-numbered order closest to the mirror-reflected light passes through the projection optical system. The f-number of the projection optical system that fulfills conditional formula (2) is smaller than or equal to that when it fulfills conditional formula (1).

Excessively reducing the f-number of the projection optical system simply complicates the fabrication while not significantly increasing the energy transmitted through the projection optical system. For this reason, in the image projection apparatus of the embodiment described above, the lower limit of the f-number under which reducing the f-number achieves no significant effect is defined by conditional formula (3). Fulfilling conditional formula (3) makes it possible to obtain an image projection apparatus that, despite being lightweight and compact, is inexpensive and boasts efficient light transfer. In the image projection apparatus of the embodiment described above, the lower limit of the f-number of the projection optical system is defined by the condition in which, on a sectional plane including the illumination optical axis, when the red mirror-reflected light has the same angle as the diffracted light of an odd-numbered order, the eight diffracted light spots next closest, after the four diffracted light spots closest, to the mirror-reflected light pass through the projection optical system. That is, when conditional formula (3) is fulfilled, at least 80% or more of the energy of the diffracted light passes through the projection optical system, and thus further reducing the f-number achieves no significant improvement in light transfer efficiency.

In the image projection apparatus of the embodiment described above, the mirror-reflected light produced as a result of the light ray along the illumination optical axis being reflected on the pixel surfaces is perpendicular to the image display surface (that is, $\gamma=0$), and coincides with the projection optical axis. This makes it possible to increase the f-number of the projection optical system. In a case where the mirror-reflected light has an angle to the projection optical axis (that is, $\gamma \neq 0$), retaining light transfer efficiency necessitates reducing the f-number of the projection optical system accordingly, making the projection optical system larger and more expensive.

What is claimed is:

1. An image projection apparatus comprising:
    a light source apparatus which emits blue, green, and red illumination light;
    a digital micromirror device which modulates intensity of the blue, green, and red illumination light on an image display surface and which thereby forms blue, green, and red images; and
    a projection optical system which projects, while enlarging, the blue, green, and red images,
    wherein the image projection apparatus fulfills conditional formula (1) below:

$$FP \leq 1/(2 \cdot \sin\{\sin^{-1}[1/(2 \cdot FI)]+\Delta\}) \tag{1}$$

where
    when
    a mirror surface forming a pixel on the image display surface of the digital micromirror device is referred to as a pixel surface,
    reflected light produced as a result of a light ray along an illumination optical axis being mirror-reflected on the pixel surface is referred to as mirror-reflected light,
    an angle between, of diffracted light produced as a result of a blue light ray along the illumination optical axis being diffracted on the digital micromirror device, a part traveling in a direction closest to the mirror-reflected light and a normal line to the image display surface is defined as a blue light diffraction angle $\beta B$,
    an angle between, of diffracted light produced as a result of a green light ray along the illumination optical axis being diffracted on the digital micromirror device, a part traveling in a direction closest to the mirror-reflected light and a normal line to the image display surface is defined as a green light diffraction angle $\beta G$, and
    an angle between, of diffracted light produced as a result of a red light ray along the illumination optical axis being diffracted on the digital micromirror device, a part traveling in a direction closest to the mirror-reflected light and a normal line to the image display surface is defined as a red light diffraction angle $\beta R$,
    then
    $\Delta$ represents a largest among the diffraction angles $\beta B$, $\beta G$, and $\beta R$,
    FI represents an f-number of the illumination light, and
    FP represents an f-number of the projection optical system.

2. The image projection apparatus according to claim 1, wherein the light source apparatus includes blue, green, and red laser light sources which emit, as the illumination light, blue, green, and red laser light respectively.

3. The image projection apparatus according to claim 2, wherein the image projection apparatus fulfills conditional formula (2) below:

$$FP \leq 1/(2 \cdot \sin\{\sin^{-1}[1/(2 \cdot FI)]+\lambda R/(\sqrt{2} \cdot d)+\gamma\}) \tag{2}$$

where
    d represents a pixel pitch of the digital micromirror device,
    $\lambda R$ represents a wavelength of the red light,
    $\gamma$ represents an angle between the mirror-reflected light and the normal line to the image display surface,
    FI represents the f-number of the illumination light, and
    FP represents the f-number of the projection optical system.

4. The image projection apparatus according to claim 3, wherein the image projection apparatus fulfills conditional formula (3) below:

$$FP \geq 1/(2 \cdot \sin\{\sin^{-1}[1/(2 \cdot FI)]+(\sqrt{5} \cdot \lambda R)/(\sqrt{2} \cdot d)+\gamma\}) \tag{3}$$

where
    d represents the pixel pitch of the digital micromirror device,
    $\lambda R$ represents the wavelength of the red light,
    $\gamma$ represents the angle between the mirror-reflected light and the normal line to the image display surface,
    FI represents the f-number of the illumination light, and
    FP represents the f-number of the projection optical system.

5. The image projection apparatus according to claim 4, wherein γ=0.

6. The image projection apparatus according to claim 1, wherein the image projection apparatus fulfills conditional formula (2) below:

$$FP \leq 1/(2 \cdot \sin \{\sin^{-1}[1/(2 \cdot FI)] + \lambda R/(\sqrt{2} \cdot d) + \gamma\}) \quad (2)$$

where
d represents a pixel pitch of the digital micromirror device,
λR represents a wavelength of the red light,
γ represents an angle between the mirror-reflected light and the normal line to the image display surface,
FI represents the f-number of the illumination light, and
FP represents the f-number of the projection optical system.

7. The image projection apparatus according to claim 6, wherein the image projection apparatus fulfills conditional formula (3) below:

$$FP \geq 1/(2 \cdot \sin \{\sin^{-1}[1/(2 \cdot FI)] + (\sqrt{5} \cdot \lambda R)/(\sqrt{2} \cdot d) + \gamma\}) \quad (3)$$

where
d represents the pixel pitch of the digital micromirror device,
λR represents the wavelength of the red light,
γ represents the angle between the mirror-reflected light and the normal line to the image display surface,
FI represents the f-number of the illumination light, and
FP represents the f-number of the projection optical system.

8. The image projection apparatus according to claim 7, wherein γ=0.

9. The image projection apparatus according to claim 1 wherein the image projection apparatus fulfills conditional formula (3) below:

$$FP \geq 1/(2 \cdot \sin \{\sin^{-1}[1/(2 \cdot FI)] + (\sqrt{5} \cdot \lambda R)/(\sqrt{2} \cdot d) + \gamma\}) \quad (3)$$

where
d represents the pixel pitch of the digital micromirror device,
λR represents the wavelength of the red light,
γ represents the angle between the mirror-reflected light and the normal line to the image display surface,
FI represents the f-number of the illumination light, and
FP represents the f-number of the projection optical system.

10. The image projection apparatus according to claim 9, wherein γ=0.

11. An image projection apparatus comprising:
a light source apparatus which emits blue, green, and red illumination light;
a first digital micromirror device which modulates intensity of the blue illumination light on an image display surface thereof and which thereby forms a blue image;
a second digital micromirror device which modulates intensity of the green illumination light on an image display surface thereof and which thereby forms a green image;
a third digital micromirror device which modulates intensity of the red illumination light on an image display surface thereof and which thereby forms a red image;
a color mixing optical device which mixes the blue, green, and red images; and
a projection optical system which projects, while enlarging, the blue, green, and red images exited from the color mixing optical device,
wherein the image projection apparatus fulfills conditional formula (1) below:

$$FP \leq 1/(2 \cdot \sin \{\sin^{-1}[1/(2 \cdot FI)] + \Delta\}) \quad (1)$$

where
when
a mirror surface forming a pixel on the image display surface of the digital micromirror device is referred to as a pixel surface,
reflected light produced as a result of a light ray along an illumination optical axis being mirror-reflected on the pixel surface is referred to as mirror-reflected light,
an angle between, of diffracted light produced as a result of a blue light ray along the illumination optical axis being diffracted on the digital micromirror device, a part traveling in a direction closest to the mirror-reflected light and a normal line to the image display surface is defined as a blue light diffraction angle βB,
an angle between, of diffracted light produced as a result of a green light ray along the illumination optical axis being diffracted on the digital micromirror device, a part traveling in a direction closest to the mirror-reflected light and a normal line to the image display surface is defined as a green light diffraction angle βG, and
an angle between, of diffracted light produced as a result of a red light ray along the illumination optical axis being diffracted on the digital micromirror device, a part traveling in a direction closest to the mirror-reflected light and a normal line to the image display surface is defined as a red light diffraction angle βR,
then
Δ represents a largest among the diffraction angles βB, βG, and βR,
FI represents an f-number of the illumination light, and
FP represents an f-number of the projection optical system.

12. The image projection apparatus according to claim 11, wherein the light source apparatus includes blue, green, and red laser light sources which emit, as the illumination light, blue, green, and red laser light respectively.

13. The image projection apparatus according to claim 12, wherein the image projection apparatus fulfills conditional formula (2) below:

$$FP \leq 1/(2 \cdot \sin \{\sin^{-1}[1/(2 \cdot FI)] + \lambda R/(\sqrt{2} \cdot d) + \gamma\}) \quad (2)$$

where
d represents a pixel pitch of the digital micromirror device,
λR represents a wavelength of the red light,
γ represents an angle between the mirror-reflected light and the normal line to the image display surface,
FI represents the f-number of the illumination light, and
FP represents the f-number of the projection optical system.

14. The image projection apparatus according to claim 13, wherein the image projection apparatus fulfills conditional formula (3) below:

$$FP \geq 1/(2 \cdot \sin \{\sin^{-1}[1/(2 \cdot FI)] + (\sqrt{5} \cdot \lambda R)/(\sqrt{2} \cdot d) + \gamma\}) \quad (3)$$

where
d represents the pixel pitch of the digital micromirror device,
λR represents the wavelength of the red light,
γ represents the angle between the mirror-reflected light and the normal line to the image display surface,
FI represents the f-number of the illumination light, and
FP represents the f-number of the projection optical system.

15. The image projection apparatus according to claim 14, wherein γ=0.

16. The image projection apparatus according to claim 11, wherein the image projection apparatus fulfills conditional formula (2) below:

$$FP \leq 1/(2 \cdot \sin\{\sin^{-1}[1/(2 \cdot FI)] + \lambda R/(\sqrt{2} \cdot d) + \gamma\}) \quad (2)$$

where d represents a pixel pitch of the digital micromirror device, $\lambda R$ represents a wavelength of the red light, $\gamma$ represents an angle between the mirror-reflected light and the normal line to the image display surface, FI represents the f-number of the illumination light, and FP represents the f-number of the projection optical system.

17. The image projection apparatus according to claim 16, wherein the image projection apparatus fulfills conditional formula (3) below:

$$FP \geq 1/(2 \cdot \sin\{\sin^{-1}[1/(2 \cdot FI)] + (\sqrt{5} \cdot \lambda R)/(\sqrt{2} \cdot d) + \gamma\}) \quad (3)$$

where d represents the pixel pitch of the digital micromirror device, $\lambda R$ represents the wavelength of the red light, $\gamma$ represents the angle between the mirror-reflected light and the normal line to the image display surface, FI represents the f-number of the illumination light, and FP represents the f-number of the projection optical system.

18. The image projection apparatus according to claim 17, wherein $\gamma=0$.

19. The image projection apparatus according to claim 11 wherein the image projection apparatus fulfills conditional formula (3) below:

$$FP \geq 1/(2 \cdot \sin\{\sin^{-1}[1/(2 \cdot FI)] + (\sqrt{5} \cdot \lambda R)/(\sqrt{2} \cdot d) + \gamma\}) \quad (3)$$

where d represents the pixel pitch of the digital micromirror device, $\lambda R$ represents the wavelength of the red light, $\gamma$ represents the angle between the mirror-reflected light and the normal line to the image display surface, FI represents the f-number of the illumination light, and FP represents the f-number of the projection optical system.

20. The image projection apparatus according to claim 19, wherein $\gamma=0$.

* * * * *